UNITED STATES PATENT OFFICE.

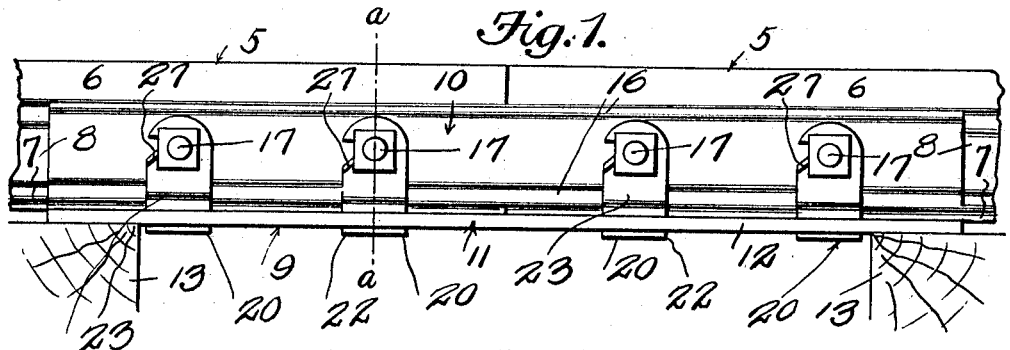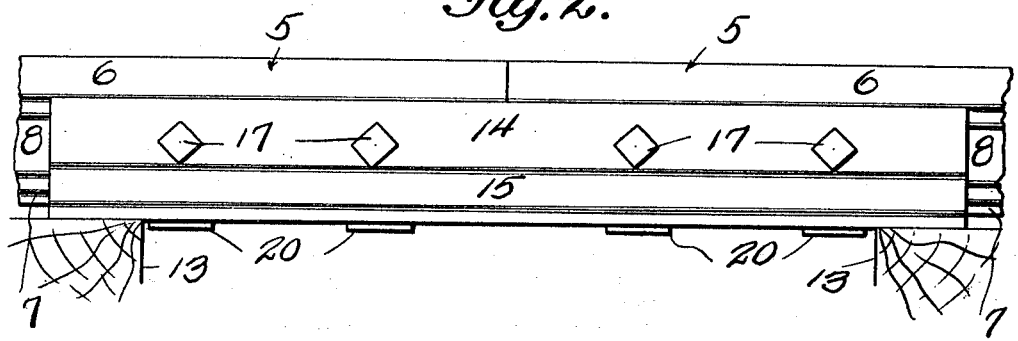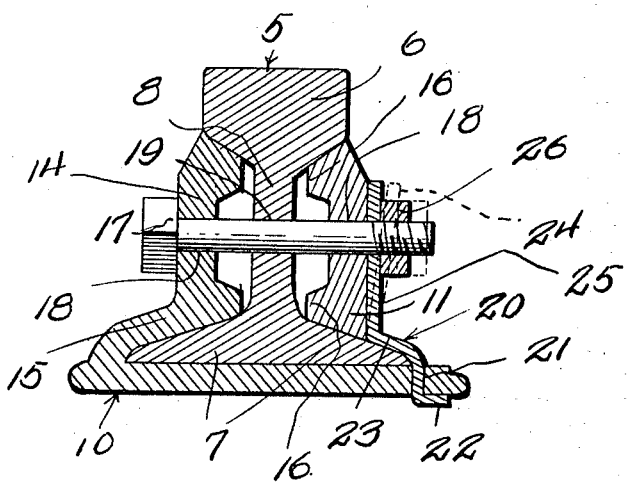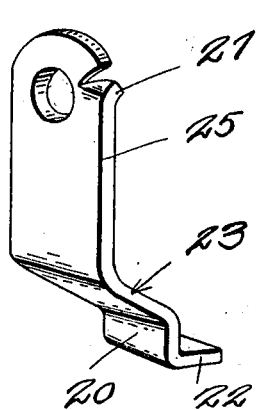

JOHN R. PRING, OF SHAWNEE, OKLAHOMA.

RAIL-JOINT.

1,051,822.

Specification of Letters Patent.

Patented Jan. 28, 1913.

Application filed July 22, 1911. Serial No. 640,011.

*To all whom it may concern:*

Be it known that I, JOHN R. PRING, a citizen of the United States, residing at Shawnee, in the county of Pottawatomie and State of Oklahoma, have invented certain new and useful Improvements in Rail-Joints, of which the following is a specification.

This invention relates to new and useful improvements in rail joints.

An object of this invention is the provision of an attachment which when applied to the meeting ends of a pair of rails will hold them securely against both vertical and lateral displacement.

Another object of this invention is the provision of an attachment comprising a pair of sections adapted to engage the meeting ends of a pair of rails and be retained in position by a plurality of bolts, and a plurality of spring joint and nut locks, the nuts of which are held against displacement by fingers formed upon combination spring joint and nut locks carried by one of the sections of the attachment.

A further object of this invention is the provision of an attachment comprising the combination spring joint and nut lock which locks the two opposite sides of the joint together at the bottom and also holds the detached section firmly against the upper face of the flange of the base of the rail. By this means in connection with the bolts keying the upper edge of this detached section firmly under the ball of the rail, the greater part of the strain is taken off of the bolts thus preventing the stretching of the said bolts. Also the upper end of the combination spring joint and nut lock is provided with the nut lock. By this means together with the combination side flange and base plate a firm, solid and tight joint is insured and low joints and the usual clicking of the wheels as they pass thereover are prevented.

A still further object of this invention is to improve and simplify devices of this character, rendering them comparatively simple and inexpensive to manufacture, reliable and efficient in use and readily operated.

With the above and other objects in view this invention resides in the novel features of construction, formations, combinations and arrangements of parts to be hereinafter more fully described, claimed and illustrated in the accompanying drawing in which:

Figure 1 is a side elevation of my invention; Fig. 2 is a view looking from the opposite side; Fig. 3 is a transverse sectional view taken on the line *a—a* of Fig. 1, and Fig. 4 is a detail perspective view of the combination spring and nut lock.

Referring to the drawings by similar characters of reference throughout the several views, the numeral 5 designates generally the meeting ends of a pair of rails each of which consists of the usual head 6, base flanges 7 and connecting web 8.

My improved attachment 9 shown clearly in Fig. 1 comprises a pair of sections 10 and 11 the former of which consists of a brace plate 12 located upon the ties 13 and formed integrally with a plate 14 offset at its lower end to engage one of the base flanges at the terminal of which it is secured to the upper face of the base plate 12. The section 11 is offset at its opposite edge as at 16 to engage the under face of the head 6 and upper side of the adjacent base flange 7 in which position it is securely held against displacement by means of connecting bolts 17 which extend through alining apertures 18 and 19 formed in the sections and the combination of spring joint and nut lock.

The combination spring joint and nut locks 20 are each located in openings 21 formed in the base plate 12 and are offset at their lower terminals as at 22 to engage the under sides of the base plates and at their intermediate portions as at 23 to engage the outer edge of the adjacent base flanges 7. The offsets 23 extend to the outer lower edge of the sections 11 at which point they are extended normally at an incline thereto as indicated by the numeral 24 referring to the dotted lines in Fig. 3. By this means the locking of the two sections together is provided for. The upper ends of these vertical spring extensions 25 surround the bolts 17 and are held in contact with the face of the section 11 by locked nuts 26 threaded upon the said bolts 17. These locked nuts are held against rotation by inclined fingers 27 formed upon the extensions 25 in such manner that the rotation of the nuts will be permitted in but one direction only owing to the incline of the said fingers and resilience of the extension.

From the foregoing disclosure taken in connection with the drawing it will be manifest that a rail joint is provided which will fulfil all of the necessary requirements of such a device.

Having thus fully described this invention what I claim as new and desire to protect by Letters Patent is:

The combination in a rail joint with the meeting ends of a pair of rails, of fish plates engaging the opposite sides of the rails, a base plate formed upon the lower edge of one fish plate and extending beneath said rails and projecting beyond the opposite sides of the rails, said base plate having a slot formed therein adjacent the edge of the rail, a fastening bolt passing through one of said rails and fish plates, a plate extending through said slot, said plate being offset at one end to engage the under side of the base plate, said plate being curved to conform to the curvature of the rail and contact with the lower edge of the adjacent fish plate, and an outwardly slanting spring extension formed upon said plate, said extension having an opening formed therein for receiving the bolt, a finger struck outwardly from said spring extension adjacent the opening and a nut threaded upon said bolt for coöperation with the spring extension and finger formed thereon.

In testimony whereof I affix my signature in presence of two witnesses.

JOHN R. PRING.

Witnesses:
 W. K. A. WILEY,
 ED PART.

---

Copies of this patent may be obtained for five cents each, by addressing the "Commissioner of Patents, Washington, D. C."